United States Patent
Inaba et al.

(10) Patent No.: US 6,572,988 B1
(45) Date of Patent: Jun. 3, 2003

(54) MAGNETIC RECORDING MEDIUM AND MAGNETIC RECORDING APPARATUS

(75) Inventors: Nobuyuki Inaba, Hasuda (JP); Kazuetsu Yoshida, Hidaka (JP); Kazusuke Yamanaka, Tsukui-gun (JP); Fumiyoshi Kirino, Suginami-ku (JP); Masaaki Futamoto, Tsukui-gun (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/385,682

(22) Filed: Aug. 30, 1999

(30) Foreign Application Priority Data

Sep. 2, 1998 (JP) .......................................... 10-248702

(51) Int. Cl.$^7$ .............................. G11B 5/66; G11B 5/70; G11B 5/012
(52) U.S. Cl. ................... 428/694 T; 428/900; 428/611; 428/668; 428/332; 360/97.01
(58) Field of Search ........................... 428/65.3, 694 T, 428/900, 611, 668, 332; 360/86, 135, 97.01

(56) References Cited

U.S. PATENT DOCUMENTS

| 4,666,770 | A | * | 5/1987 | Asai et al. | ................... 428/323 |
| 5,413,873 | A | | 5/1995 | Mizukami | ................... 428/611 |
| 5,660,929 | A | | 8/1997 | Suzuki et al. | ................ 428/332 |
| 6,020,060 | A | * | 2/2000 | Yoshida et al. | ............. 428/332 |
| 6,139,950 | A | * | 10/2000 | Wu et al. | ................... 428/332 |

OTHER PUBLICATIONS

The 7th Joint MMM–INTERMAG Conference.

IEEE Transactions on Magnetics, vol. 34, No. 4, Jul. 1998, pp. 1558–1561.

* cited by examiner

Primary Examiner—Holly C Rickman
(74) Attorney, Agent, or Firm—Mattingly, Stanger & Malur, P.C.

(57) ABSTRACT

A magnetic recording medium has a magnetic recording film in which the magnitude of saturation magnetization Ms(T=5° K) at 5° K and magnitude of saturation magnetization Ms(T=300° K) at 300° K satisfy: Ms(T=300° K)/Ms(T=5° K)≧0.75. The recording medium enables the high-density recording, and a magnetic recording apparatus using this recording medium can yield a sufficiently high reproduction signal level within the operating temperature range of the apparatus.

16 Claims, 4 Drawing Sheets

MAGNETIC RECORDING MEDIUM AND MAGNETIC RECORDING APPARATUS

BACKGROUND OF THE INVENTION

The present invention relates to a magnetic recording medium which is suitable for the high-density magnetic recording and to a magnetic recording apparatus which uses this magnetic recording medium.

In the field of magnetic recording, there are the schemes of longitudinal recording and perpendicular recording, of which the former is generally adopted at present. The longitudinal recording is a scheme of magnetic recording in which a magnetic recording head is used to form record bits by magnetizing the magnetic recording medium in parallel to the medium surface and in such directions that N poles or S poles of adjacent bits face to each other. The perpendicular recording is a scheme of magnetic recording in which a magnetic recording head is used to form record bits by magnetizing the magnetic recording medium perpendicularly to the medium surface such that adjacent bits are magnetized in anti-parallel directions.

Both schemes are designed to read recorded information out of the recording medium based on the detection with the magnetic head of the magnetic flux straying from recorded bits. Therefore, the greater the quantity of stray magnetic flux, the higher is the detected output level of recorded information by the magnetic head. The quantity of stray magnetic flux from a bit is approximately proportional to the magnetic moment which forms the bit. Namely, for magnetization M which is the magnetic moment per unit volume of the medium and the volume V of a recorded bit, the stray magnetic flux $\phi$ from a bit is approximately proportional to MV.

This means that if the area of a recorded bit on the medium decreases as a result of the raising of recording density, the stray magnetic flux from the bit will decrease and the head output level will fall. On this account, in order to accomplish the high-density recording, it is necessary to enhance the sensitivity of reproduction head to the extent of compensating the reduced stray magnetic flux and ensure a sufficient magnitude of magnetization M of the medium.

SUMMARY OF THE INVENTION

The magnitude of magnetization of the magnetic recording medium varies depending on the temperature. Generally, ferromagnetic substance has a trend of directing the magnetic moment of ferromagnetic atoms to the same direction due to the exchange interaction between magnetic moments. The magnetic moment, except for the state of 0° K, is fluctuating by receiving thermal energy. The higher the temperature, the greater is the amplitude of fluctuating. Accordingly, as the temperature rises, the thermal fluctuation energy supersedes the energy that equalizes directs to the same direction of the magnetic moment based on the exchange interaction. The magnetization which is the value of the average magnetic moment per unit volume decreases gradually with the rise of temperature, causing the transition of the medium from ferromagnetic substance to non-magnetic substance at the Curie temperature.

Therefore, even though there is ensured a sufficient magnitude of magnetization of the medium at the room temperature, if the magnetization of medium decreases sharply due to the temperature rise of the magnetic recording apparatus within its operating temperature range, the stray magnetic flux from recorded bits will also decrease sharply, resulting in a reduced output of the reproduction head.

Accordingly, it is an object of the present invention to accomplish a high recording density and provide a magnetic recording medium and a magnetic recording apparatus which are capable of producing a sufficient reproduction output throughout the operating temperature range of the magnetic recording apparatus.

At the current laboratory development stage, there is reported the accomplishment of a magnetic recording medium of the type of longitudinal recording having an areal recording density of the order of 10 Gbit per square inch (The 7th MMM-Intermag Joint Conference, session ZA, San Francisco, U.S.A., January 1998). With the bit length to track width ratio being assumed to be 20 to 1 approximately that is adopted in general, the linear recording density is evaluated to be about 400 kFCI and the bit length to be about 60 nm.

In order for the longitudinal recording scheme to achieve a high medium S/N performance of recording and reproduction at a high linear recording density, it is necessary to minimize the length of transition region between recorded bits thereby to reduce the transition noise attributable to the zig-zag domain of the transition region of the medium.

The length of transition region of the medium is generally proportional to the product of the thickness t of the magnetic recording layer of the medium and the residual magnetization Br of the recording layer. Accordingly, the smaller the product Br·t of the residual magnetization and film thickness, the smaller is the noise and more improved is the medium S/N at a high linear recording density. However, a smaller product Br·t in excess causes the stray magnetic flux from recorded bits to decrease, resulting in a reduced reproduction head output. On this account, in order to prevent the deterioration of the medium S/N and head output at a high linear recording density, the product of the residual magnetization and film thickness needs to be set in the range: 30 Gauss·$\mu$m<Br·t<80 Gauss $\mu$m.

For a linear recording density as high as around 400 kFCI, the bit length becomes about 60 nm, and assuming that magnetic crystal grains of the recording film have an average size of 15 nm or more, the bit length is filled by four crystal grains at most. The fluctuation of zig-zag domain in the transition region attributable to the distribution of crystal grain sizes and the distribution of crystal grain orientation will increase, resulting in an increased medium noise which is derived from the transition noise. Therefore, it is necessary to increase the number of crystal grains in the bit length direction and reduce the average crystal grain size below 15 nm.

However, a magnetic crystal grain with a size smaller than or equal to 5 nm is too small in its volume, causing the thermal fluctuation energy of magnetic moment to supersede the magnetic anisotropic energy of magnetic crystal grain for directing its magnetic moment to the easy axis of magnetization, and it cannot have the magnetic moment orientation stabled in the direction of easy axis of magnetization, exhibiting the property of super-paramagnetism. On this account, the size d of magnetic crystal grains needs to be in the range: 5 nm<d<15 nm.

Next, it is necessary to make the stray magnetic flux from recorded bits less dependent on the temperature variation and let the magnetic head produce a large output signal even if the temperature varies. Specifically, the medium structure needs to be designed so that the temperature-dependent variation in the quantity of stray magnetic flux from recorded bits decreases at least in the operating temperature range of the magnetic recording apparatus. For the achievement of this requirement, the inventive magnetic recording medium adopts the ferromagnetic thin film structure having a small temperature-dependent variation of saturation magnetization at least in the temperature range smaller than or equal to 350° K.

The magnitude of saturation magnetization of the medium decreases as the temperature rises, as mentioned previously, and the magnetization vanishes at the Curie temperature. FIG. 1 is a brief graphical representation of the temperature-dependent variation of saturation magnetization. Generally, the temperature-dependent variation of saturation magnetization increases as the temperature approaches the Curie temperature. Accordingly, if the Curie temperature of the medium is close to the operating temperature range of the magnetic recording apparatus, the medium has its magnetization varied greatly in response to the temperature variation even within the operating temperature range. Therefore, the Curie temperature needs to be high enough outside the operating temperature range of the apparatus.

Magnetic alloy has its Curie temperature affected greatly by the combination and proportion of elements which compose the magnetic material and is also dependent on as to whether the material is in the order state or disorder state in the case of order alloy. Briefly, in case a non-magnetic element is added to Co, the Curie temperature in the alloy state is prone to be lower as compared with the Curie temperature of the simple Co element. This trend is more pronounced as the quantity of additive element increases. The reason for this phenomenon is the emergence of portions where the exchange interaction between Co atoms weakens due to the replacement of the Co element in the crystal orientation with the non-magnetic element.

The magnetic recording medium is a polycrystalline thin film formed of magnetic crystal grains having sizes of around 15 nm or less. The magnetic characteristics of the whole film are derived generally from the magnetic characteristics of each crystal grain. Provided that each magnetic crystal grain has a sufficiently high Curie temperature outside the operating temperature range of the magnetic recording apparatus and has a property of smaller variation of magnetization within the operating temperature range, the film of medium will have the same trend of general magnetic characteristics.

This property is attained by increasing the proportion of ferromagnetic element and reduce the additive element in each magnetic crystal grain. However, if the proportion of magnetic element in magnetic crystal grains is simply increased, the exchange interaction between crystal grains emerges, resulting in an increased noise at the reproduction of medium attributable to the zig-zag domain in the transition region of recorded bits. Therefore, it is necessary to design the medium structure so that the exchange interaction between crystal grains weakenes, i.e., non-magnetization for the grain boundary.

There is a conflict between the magnetic characteristics required of the crystal grain itself and the magnetic characteristics required of the grain boundary as mentioned above. A magnetic recording medium which meets these two conflicting characteristics can be accomplished based on the film forming process with higher sputtering energy as compared with the conventional sputtering process for a magnetic material of Co—Cr alloy, for example, and the subsequent annealing process so that the additive element in magnetic crystal grains diffuses and segregates to grain boundaries, as will be described in the following embodiment of invention.

Specifically, the present invention resides in a magnetic recording medium having a magnetic recording film formed on a substrate, wherein the magnetic recording film has an average magnitude of saturation magnetization Ms(T=5° K) at 5° K and average magnitude of saturation magnetization Ms (T=300° K) at 300° K which satisfy: Ms(T=300° K)/Ms (T=5° K)≧0.75.

With the size of a magnetic crystal grain of the magnetic recording film being defined in terms of the diameter of a circle having the same area as the magnetic crystal grain along the film surface, the average size d of magnetic crystal grains is preferably greater than 5 nm and smaller than 15 nm. Preferably, with respect to the minimum bit length L of recorded bits, the average size d of magnetic crystal grains satisfies: 12>L/d>4.

In the case of a magnetic recording medium of the type of longitudinal recording, the thickness t ($\mu$m) of the magnetic recording film and the average residual magnetization Br (Gauss) of the magnetic recording film at 300° K satisfy preferably: 30 Gauss·m<Br·t<80 Gauss·$\mu$m.

With the saturation magnetization Ms (T) being normalized by Ms(T=5° K) to be m(T)=Ms(T)/Ms(T=5° K) within the temperature range: 5° K≦T≦350° K and formulated approximately by a polynomial of absolute temperature T, the normalized saturation magnetization m(T) decreases virtually linearly in proportion to $T^2$, and this linear relation, when expressed in terms of the gradient A of the slope and the intersection B of the slope with the m(T) axis as m(T)=−A·$T^2$+B, satisfies: 0<A≦2.8×$10^{-6}$ ($K^{-2}$). The relation m(T1)=0 is met at a temperature T1 of T1≧600° K. The normalized saturation magnetization m(T) has a temperature-dependent variation per 1° K of 0.002 at maximum within the temperature range: 5° K≦T≦350° K.

Magnetic recording apparatus are designed to operate at temperatures ranging from the lowest 0° C. (273° K) up to the highest 50° C. (323° K) in general, and the apparatus interior temperature will rise up to around 75° C. (348° K). Accordingly, if the constant A and T1 and the temperature-dependent variation of m(T) meet the above conditions, the variation of saturation magnetization within the temperature range from about 273° K to about 350° K can be as small as around 15%, and the variation of head output signal level attributable to the temperature-dependent variation of saturation magnetization is confined within the allowable range for the operation of apparatus.

The present invention also resides in a magnetic recording apparatus which includes a magnetic recording medium, a recording medium driver, a magnetic head, a head driver, and a recording/reproduction signal processing system, with the above-mentioned magnetic recording medium being used for the recording medium.

The inventive magnetic recording medium can be adapted to longitudinal recording in which the average magnetic moment of recorded bits on the medium is virtually parallel to the film surface, and also to perpendicular recording and oblique recording in which the magnetic moment of recorded bit is not parallel to the film surface.

DESCRIPTION OF THE PREFERRED EMBODIMENTS

Embodiments of the present invention will be explained with reference to the drawings.

Embodiment 1

Figure 1:
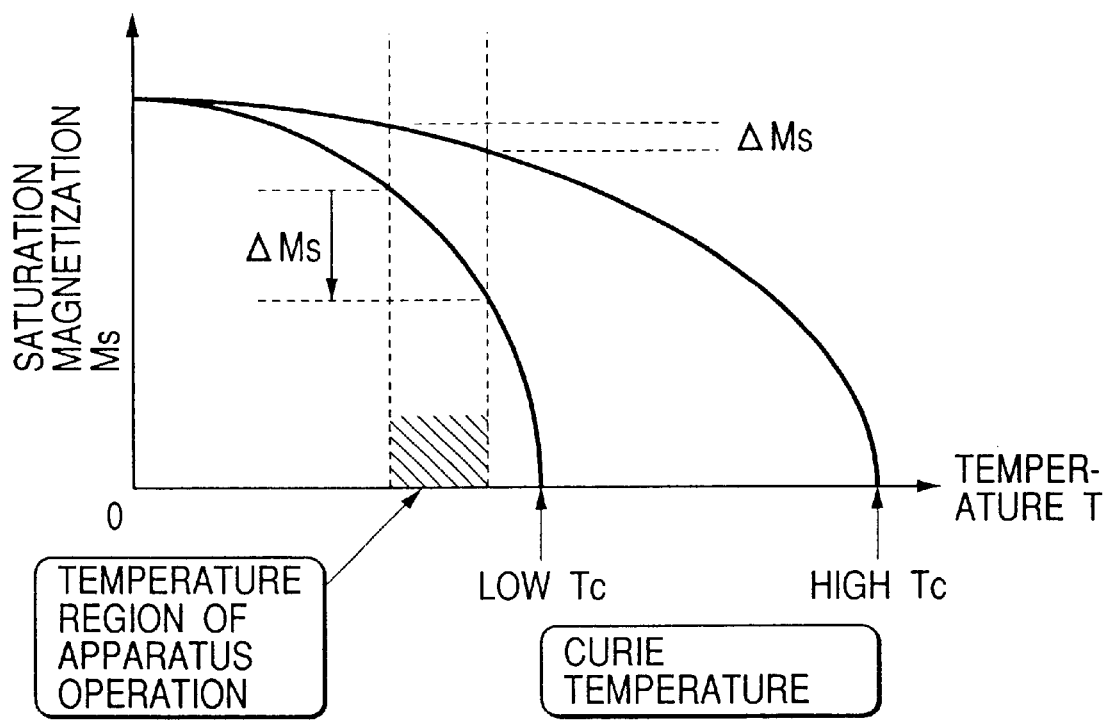
FIG. 1 is a brief graphical representation of the temperature-dependent variation of saturation magnetization.
Figure 2A:
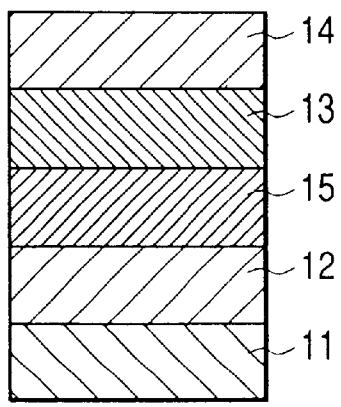
FIGS. 2A and 2B are brief cross-sectional views of examples of structure of magnetic recording media for longitudinal recording.
Figure 2B:
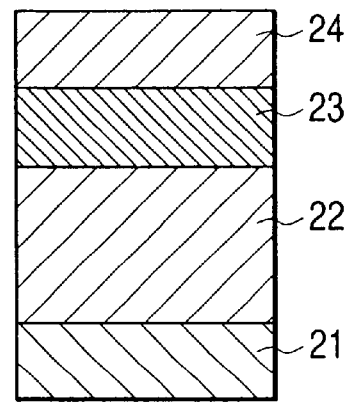

FIGS. 2A and 2B are brief cross-sectional views showing examples of the inventive and conventional magnetic recording media, respectively, for longitudinal recording. The inventive recording medium has a structure in which an growth-orientation control underlayer 12 and a lattice mismatch adjusting layer 15 are formed sequentially on a substrate 11, with a magnetic recording film 13 and a protection film 14 being formed thereon. In contrast, the conventional recording medium has a structure in which a thin film 23 of cobalt alloy is formed as recording layer on the substrate 21 through an orientation control underlayer 22 of magnetic film, with a protection film 24 being formed thereon.

Next, the fabricating procedure of the magnetic recording medium of the inventive structure shown in FIG. 2A will be explained. A cleaned quartz substrate 11 for the 3.5-inch disk was placed on the sputtering device for film formation, the chamber was evacuated to a degree of vacuum of $1 \times 10^{-8}$ Torr or lower, the substrate 11 was heated to 300° C., and it was kept at the steady-state temperature for one hour. On the substrate 11, a Cr film (thickness: 10 nm) for the orientation control underlayer 12 and a Cr—15 at % Ti film (thickness: 30 nm) for the lattice mismatch adjusting layer 15 were formed sequentially. These two underlayers were formed by the d.c. magnetron sputtering process at an Ar gas pressure of 3 mTorr and at a deposition rate of 2 nm/s.

After that, on the resulting multi-underlayer film, a magnetic film (thickness: 15 nm) 13 having an average composition of Co—15 at % Cr—10 at % Pt—3 at % Ta was formed by the ECR (Electron Cyclotron Resource) sputtering process which is higher in energy at film formation than the d.c. magnetron sputtering process. During the film forming process, the Ar gas pressure was kept at 0.5 mTorr and the d.c. voltage applied to the targets was adjusted so that the deposition rate is 0.3 nm/s.

Subsequently, with the vacuum state being retained, a heat treatment in vacuum was conducted. Specifically, the heating chamber was evacuated to a degree of vacuum of $5 \times 10^{-9}$ Torr, the substrate with the film formed thereon was heated to a steady-state temperature of 450° C., kept heated for one hour, and cooled down to the room temperature at 25° C./min. After that, a carbon protection film (thickness:15 nm) was formed on the outmost surface at the room temperature.

All targets except for the C target have a purity of 99.9%, and alloy targets were used to form the alloy thin film. The above-mentioned film composition of each layer was assessed in terms of the average composition of thin film determined based on the scheme of ICPS (Inductively Coupled Plasma Spectroscopy). This sample of medium will be called "sample A" hereinafter.

A magnetic recording medium for comparison having a cross-sectional structure shown in FIG. 2B was fabricated in the following manner. Shown is an example of fabrication of a medium having a magnetic film composition of Co—20 at % Cr—8 at % Pt. A cleaned NiP-plated Al alloy disk 21 for the magnetic disk was placed on the sputtering device for film formation, the chamber was evacuated to a degree of vacuum of $1 \times 10^{-8}$ Torr or lower, the substrate 21 was heated to 270° C., and it was kept at the steady-state temperature for one hour. On the substrate 21, a Cr film (thickness: 50 nm) for the orientation control underlayer 22, a Co—Cr—Pt magnetic film (thickness: 15 nm) 23 and a carbon protection film 24 were formed sequentially. These thin films were formed by the d.c. magnetron sputtering process at an Ar gas pressure of 3 mTorr.

All targets except for the C target have a purity of 99.9%, and alloy targets were used to form the magnetic film. This sample of medium will be called "sample B" hereinafter.

The fabricated medium samples underwent the assessment of recording/reproduction characteristics, and were thereafter cut into pieces and examined for the film structure and magnetic characteristics. The structure of medium thin film was examined based on the x-ray diffraction scheme. As a result of the θ-2θ x-ray diffraction measurement for sample B of the conventional structure, the (200) surface reflection of the Cr underlayer 22 and the (11.0) surface reflection of the hexagonal close packing structure of the Co—Cr—Pt magnetic film 23 were observed.

For sample A, the (200) surface reflection of the Cr—Ti underlayer 15 and the (110) surface reflection with an x-ray diffraction strength, which was ⅒ of the (200) surface reflection, were observed. The major reflection of the magnetic film 13 was the (11.0) surface reflection, and a (10.1) surface reflection peak which is about 1/15 in strength of the major reflection peak was observed. The measurement result suggests the growth of the magnetic film 13 in the (10.1) orientation based on that most crystal grains of the Cr—Ti underlayer 15 are in the (100) orientation, the magnetic film 13 of epitaxial growth on this underlayer is in the (11.0) orientation, and partial magnetic crystal grains form the Cr—Ti underlayer in the (110) orientation. The diffraction surface of the magnetic film was displayed in the manner of four-index display, with the third term being omitted. There was confirmed no clear x-ray diffraction peak from the Cr underlayer 12.

For the examination of the detailed crystal structure of both samples, an electron microscope was used to observe the planar TEM image of the magnetic film. Sample B of the conventional structure has a broad distribution of crystal grain sizes with an average size of about 15 nm. In contrast, sample A has a crystal grain size distribution narrower by about 20% than that of sample B, with the average size being about 12 nm.

In regard to the cross-sectional structure of crystal grains, it was found that the Cr—Ti underlayer and magnetic film have a continuous crystal lattice and are created based on epitaxial growth. The size of a crystal grain is defined in terms of the diameter of a circle having the same area as the crystal grain along the film surface.

For the examination of the distribution of composition at the scale of crystal grain, the composition analysis was conducted at arbitrary measuring points of the magnetic film by use of an EDX (Energy Dispersive X-ray) spectroscope having a spatial resolution of 2 nm. The result of analysis for sample A reveals that the Cr element is as much as 30 at % or more at the grain boundary and has an average value of about 8 at % inside the crystal grain. The quantity of Cr inside the crystal grain is half the average composition of the film.

The analysis result for sample B reveals that the concentration of Cr element is as much as 23 at % at the grain boundary, which is merely greater by about 3 at % than the average composition. Although the observation inside the crystal grain indicates the reduction of Cr concentration by about 3 at % at the section near the grain boundary relative to the average composition due to the segregation of Cr at the grain boundary, the central section of crystal grain is virtually consistent with the average composition. Namely, sample B did not exhibit a clear composition segregation structure that causes the variation of composition of the entire crystal grain which was observed in sample A.

Figure 3:
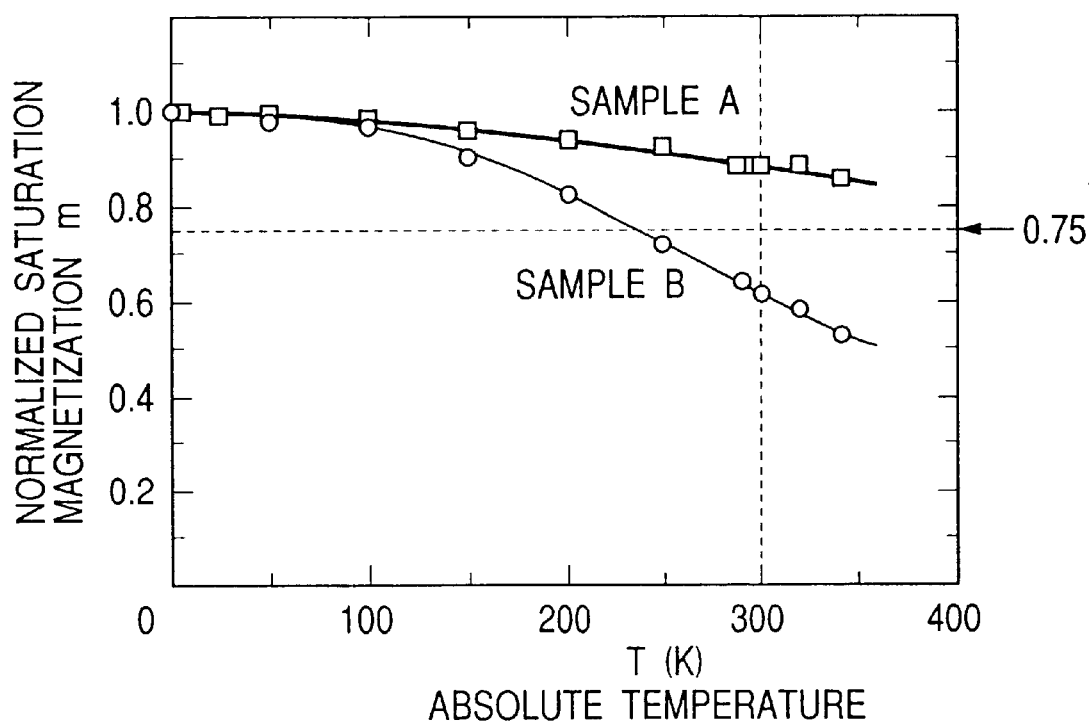
FIG. 3 is a graph showing the temperature-dependent variation of normalized saturation magnetization of a magnetic recording medium formed of Co—Cr alloy for longitudinal recording.

For samples A and B, magnetization curves were plotted at various temperatures ranging from 5° K to 350° K. FIG. 3 shows the temperature-dependent variation of saturation magnetization m normalized by the magnitude of saturation magnetization of each sample at T=5° K. Both samples exhibit the simple decrease of the normalized saturation magnetization with the rise of temperature. Sample B has a greater variation of m=0.65 at T=300° K as compared with m=0 at T=300° K of sample A. Both samples A and B have a product Br·t of the residual magnetization and film thickness of 55 Gauss·μm.

Figure 4:
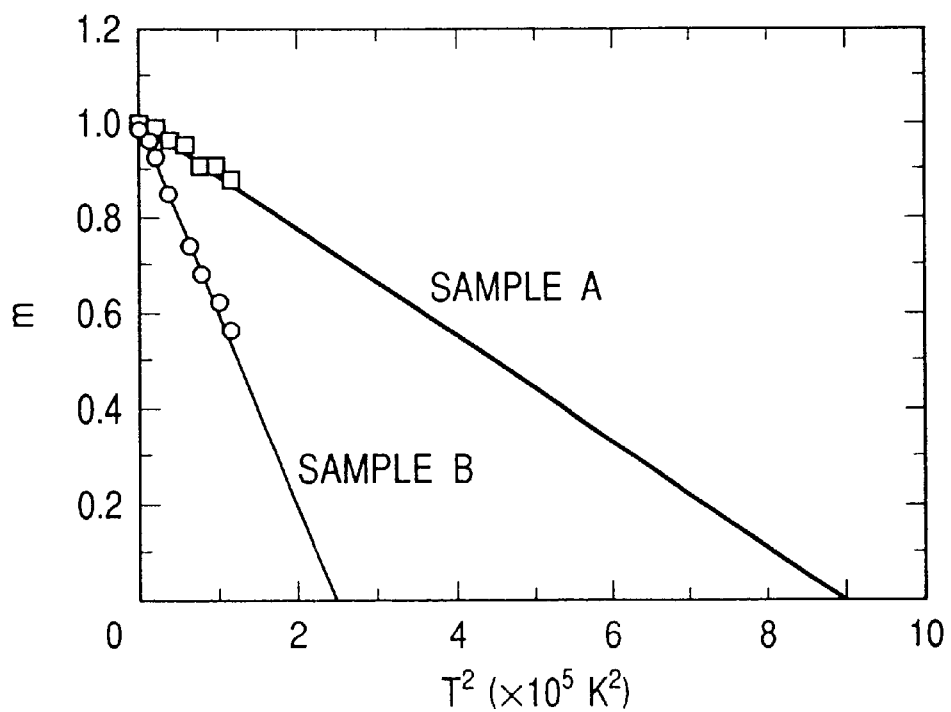
FIG. 4 is a graph showing the dependency on temperature $T^2$ of the normalized saturation magnetization.

FIG. 4 is a graph which is derived from FIG. 3, with the normalized saturation magnetization m(T) being plotted along the horizontal axis of $T^2$. Both samples exhibit the simple virtually-linear decrease of the normalized saturation magnetization(T) with $T^2$ and it can be expressed approximately as $m(T) = -A \cdot T^2 + B$. For the measurement result of sample A, constants A and B of the approximate expression are evaluated by using the least square method as follows.

$$m(T) = 1.00 - (1.11 \times 10^{-6}) T^2 \quad (1)$$

The slope intersects the $T^2$ axis at temperature T1=946° K.

The normalized saturation magnetization m(T) decreases simply with the temperature rise, i.e., increase of $T^2$, as shown in FIG. 4, and m(T) has the largest temperature-dependent variation at around T=350° K in the temperature range 5° K≦T≦350° K. Sample A takes m(T=320° K)=0.896 and m(T=340° K)=0.871, and the variation of m(T) per 1° K is evaluated to be 0.0013 as follows.

$$\Delta m = -[m(T=340° K) - m(T=320° K)]/[340° K - 320° K] = 0.0013 \quad (2)$$

For sample B, the approximate expression $m(T) = -A \cdot T^2 + B$ has its constants determined as shown by (3) in the following, and the slope intersects the $T^2$ axis at temperature T1=500° K. It takes m(T=320° K)=0.59 and m(T=340° K)=0.538, and the variation of m(T) per 1° K is Δ m=0.003.

$$m(T) = 1.00 - (4.01 \times 10^{-6}) T^2 \quad (3)$$

The magnetic recording media having the foregoing magnetic characteristics were used to build a magnetic recording apparatus. This magnetic recording apparatus has the known structure, as shown by a plan view in FIG. 7A and a cross-sectional view in FIG. 7B taken along the line A—A of FIG. 7A. It includes a magnetic recording medium 91, a medium driver 92 which turns the recording medium 91, a magnetic head 93 which records and reproduces signals by moving across the turning recording medium 91, a head driver 94 which moves the magnetic head 93 across the recording medium 91, and a recording/reproduction signal processing system 95 which supplies a signal to be recorded to the magnetic head and processes the reproduced signal from the magnetic head.

Figure 7A:
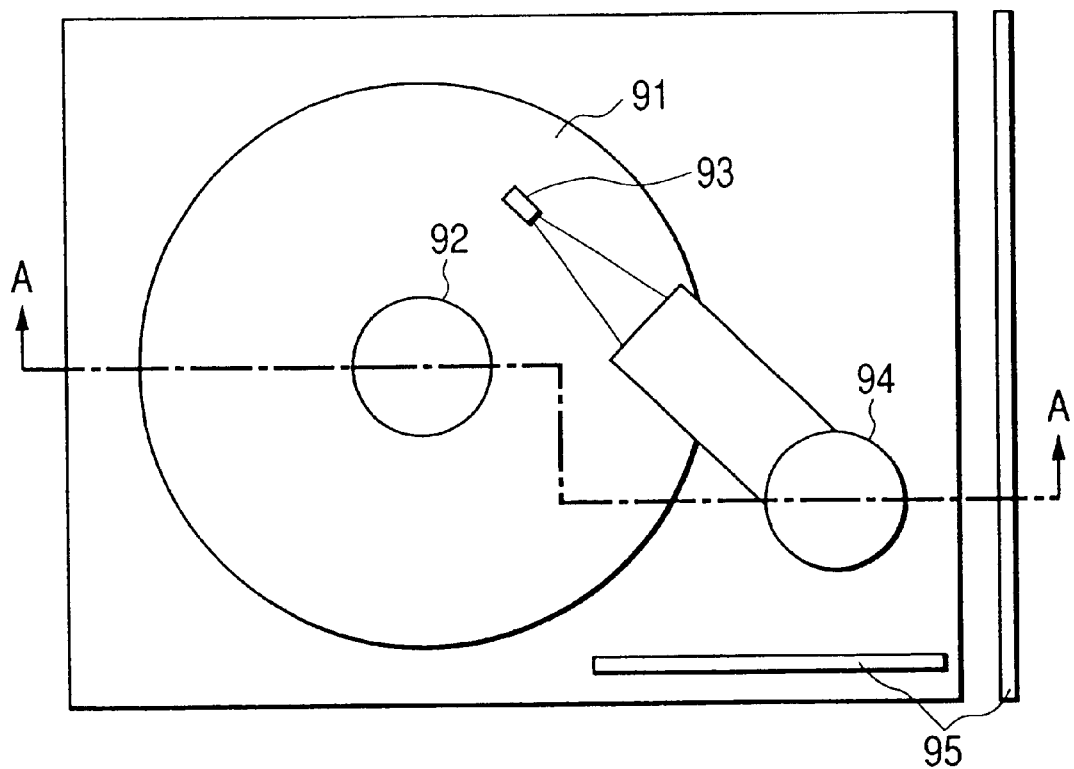
FIG. 7A is a brief plan view of the magnetic recording apparatus based on this invention.
Figure 7B:
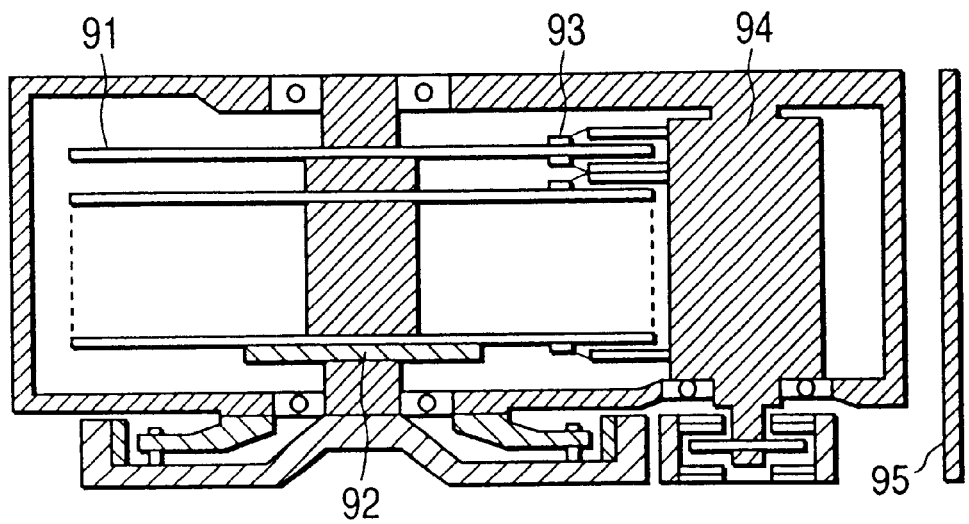
FIG. 7B is a brief cross-sectional view taken along the line A—A of FIG. 7A.

The magnetic recording media of samples A and B were mounted on the magnetic recording apparatus shown in FIGS. 7A and 7B to compare their recording/reproduction characteristics. A thin-film head with a track width of 2.5 μm and a gap length of 0.3 μm was used for recording, and a head of the magneto-resistive effect type with a track width of 2 μm was used for reproduction. At both recording and reproduction, the head was afloat over the medium protection film surface with a clearance of 0.07 μm, with the slider having a relative speed of 11 m/s with respect to the substrate.

Initially, recording at a linear recording density of 20 kFCI was conducted at the room temperature (T=296° K), and next reproduction was conducted at the same temperature. Subsequently, the apparatus was heated to a steady-state temperature of T=350° K in a thermal chamber, and the signal which had been recorded at 20 kFCI at the room temperature was reproduced and compared with the output signal reproduced at room temperature.

The reproduction output at T=350° K normalized by that at the room temperature (T=296° K) was 0.85 in the case of sample A, whereas the counterpart of sample B was as half as 0.51. In addition to the fall of reproduction output due to the temperature rise, the magnitude of noise increased, particularly in the case of sample B. From the viewpoint of S/N characteristics, the degradation of S/N is more pronounced than the output reduction in the case of sample B.

The magnetic recording apparatus in operation has its internal temperature varying depending on the operational environment of the apparatus. It is necessary for the apparatus to meet the operational condition even if its temperature rises. Specifically, the variation of reproduction output signal must be within 30% for the room temperature when the apparatus is at 350° K. This condition is met by sample A of the inventive medium which has an output reduction of about 20%, whereas sample B has its reproduction output falling to a half and does not ensure the normal operation of the apparatus.

Besides the foregoing samples, two other kinds of magnetic recording media were fabricated by using Co—19 at % Cr—10 at % Pt—3 at % Ta and Co—22 at % Cr—10 at % Pt—3 at % Ta for the magnetic film of the magnetic recording layer based on the same film forming process as for sample A. The magnetic recording medium having the magnetic film of Co—19 at % Cr—10 at % Pt—3 at % Ta will be called "sample C", and the magnetic recording medium having the magnetic film of Co—22 at % Cr—10 at % Pt—3 at % Ta will be called "sample D".

A transmission electron microscope was used to observe the surface image of magnetic crystal grains of the magnetic film, revealing an average crystal grain size of 11 nm for sample C and 14 nm for sample D. The product Br·t of residual magnetization and film thickness was 50 Gauss·μm for sample C and 85 Gauss·μm for sample D.

Both samples C and D exhibit the normalized saturation magnetization m of 0.75 or more at T=300° K, and it decreases virtually linearly in proportion to $T^2$. The constant A of the gradient of slope, the maximum temperature-dependent variation of normalized saturation magnetization m per 1° K in the temperature range of 5° K≦T≦350° K, and the reduction of reproduction output at T=350° K relative to the room temperature were as shown in the following Table 1.

TABLE 1

|  | Constant A | T1 | Variation of m | Reduction of reproduced signal |
|---|---|---|---|---|
| Sample C | $1.7 \times 10^{-6}$ | 775° K | 0.0012 | 21% |
| Sample D | $2.5 \times 10^{-6}$ | 632° K | 0.0018 | 28% |

Sample D is conceived to barely meet the condition for the normal operation of the magnetic disk apparatus in terms of the fall of reproduced signal level caused by the temperature variation.

Figure 5A:
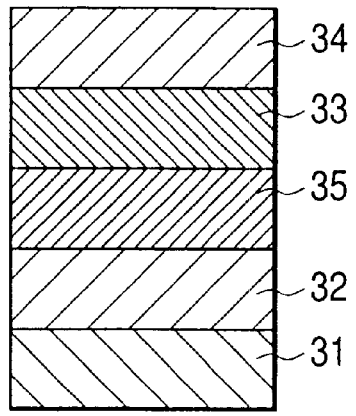
FIG. 5A is a brief cross-sectional view of the inventive magnetic recording medium for perpendicular recording.
Figure 5B:
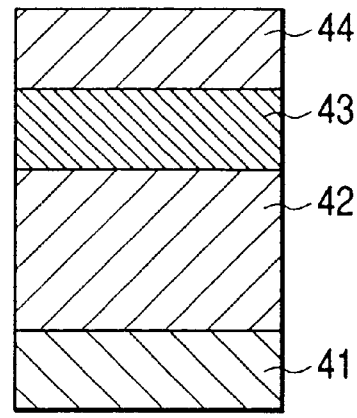
FIG. 5B is a brief cross-sectional view of the conventional magnetic recording medium for perpendicular recording.

Embodiment 2:

FIGS. 5A and 5B are brief cross-sectional views showing examples of the inventive and conventional magnetic recording media, respectively, for perpendicular recording. The conventional recording medium has a structure in which a thin film 43 of cobalt alloy is formed as recording layer on a substrate 41 through an orientation control underlayer 42, with a protection film 44 being formed thereon. In contrast, the inventive recording medium has a structure in which another orientation control underlayer 35 is formed on the conventional orientation control underlayer 32 on the substrate 31 with the intention of improving the crystal orientation, and a magnetic recording film 33 and a protection film 34 are formed on it.

Next, the fabricating procedure of the magnetic recording medium of the inventive structure shown in FIG. 5A will be explained. A cleaned quartz substrate 31 for the 3.5-inch disk was placed on the sputtering device for film formation, the chamber was evacuated to a degree of vacuum of $1 \times 10^{-8}$ Torr or lower, the substrate 31 was heated to 300° C., and it was kept at the steady-state temperature for one hour.

On the substrate 31, a Ti film (thickness: 30 nm) for the orientation control underlayer 32 and a Ti—15 at % Cr film (thickness: 30 nm) for the orientation control underlayer 35 were formed sequentially. These two underlayers were formed by the d.c. magnetron sputtering process at an Ar gas pressure of 3 mTorr and at a deposition rate of 2 nm/s.

After that, on the resulting multi-underlayer film, a magnetic film (thickness: 50 nm) 33 having an average composition of Co—15 at % Cr—10 at % Pt—3 at % Ta was formed by the ECR sputtering process which is higher in energy at film formation than the d.c. magnetron sputtering process. During the film forming process, the Ar gas pressure was kept at 0.5 mTorr and the d.c. voltage applied to the targets was adjusted so that the deposition rate is 0.3 nm/s.

Subsequently, with the vacuum state being retained, a heat treatment in vacuum was conducted for the resulting thin film sample. Specifically, the heating chamber was evacuated to a degree of vacuum of $5 \times 10^{-9}$ Torr, the substrate with the film formed thereon was heated to a steady-state temperature of 450° C., kept heated for one hour, and cooled down to the room temperature at 25° C./min. After that, a carbon protection film (thickness: 15 nm) 34 was formed on the outmost surface at the room temperature.

All targets except for the C target have a purity of 99.9%, and alloy targets were used to form the alloy thin film. The above-mentioned film composition of each layer was assessed in terms of the average composition of thin film determined based on the scheme of ICPS (Inductively Coupled Plasma Spectroscopy). This sample of medium will be called "sample E" hereinafter.

A conventional magnetic recording medium having a cross-sectional structure shown in FIG. 5B was fabricated in the following manner. Shown is an example of fabrication of a medium having a magnetic film composition of Co—20 at % Cr—8 at % Pt. A cleaned NiP-plated Al alloy disk 41 for the magnetic disk was placed on the sputtering device for film formation, the chamber was evacuated to a degree of vacuum of $1 \times 10^{-8}$ Torr or lower, the substrate 41 was heated to 270° C., and it was kept at the steady-state temperature for one hour. On the substrate 41, a Ti film (thickness: 50 nm) for the orientation control underlayer 42, a Co—Cr—Pt magnetic film (thickness: 50 nm) 43 and a carbon protection film 44 were formed sequentially. These thin films were formed by the d.c. magnetron sputtering process at an Ar gas pressure of 3 mTorr.

All targets except for the C target have a purity of 99.9%, and alloy targets were used to form the magnetic film. This sample of medium will be called "sample F" hereinafter.

The fabricated medium samples underwent the assessment of recording/reproduction characteristics, and were thereafter cut into pieces and examined for the film structure and magnetic characteristics. The structure of medium thin film was examined based on the x-ray diffraction scheme. As a result of the θ-2θ x-ray diffraction measurement for samples E and F, the (00.2) surface reflection of the hexagonal close packing structure was observed on the magnetic film. Sample F has a broader peak than sample E.

Although both samples are basically perpendicular magnetic films with their c axis of magnetic film growing in the direction normal to the film surface, the measurement result suggests that sample E has the better c-axis alignment as compared with sample F. A transmission electron microscope was used to observe magnetic crystal grains of the magnetic film, revealing an average crystal grain size of 14 nm for sample E and 16 nm for sample F.

Figure 6:
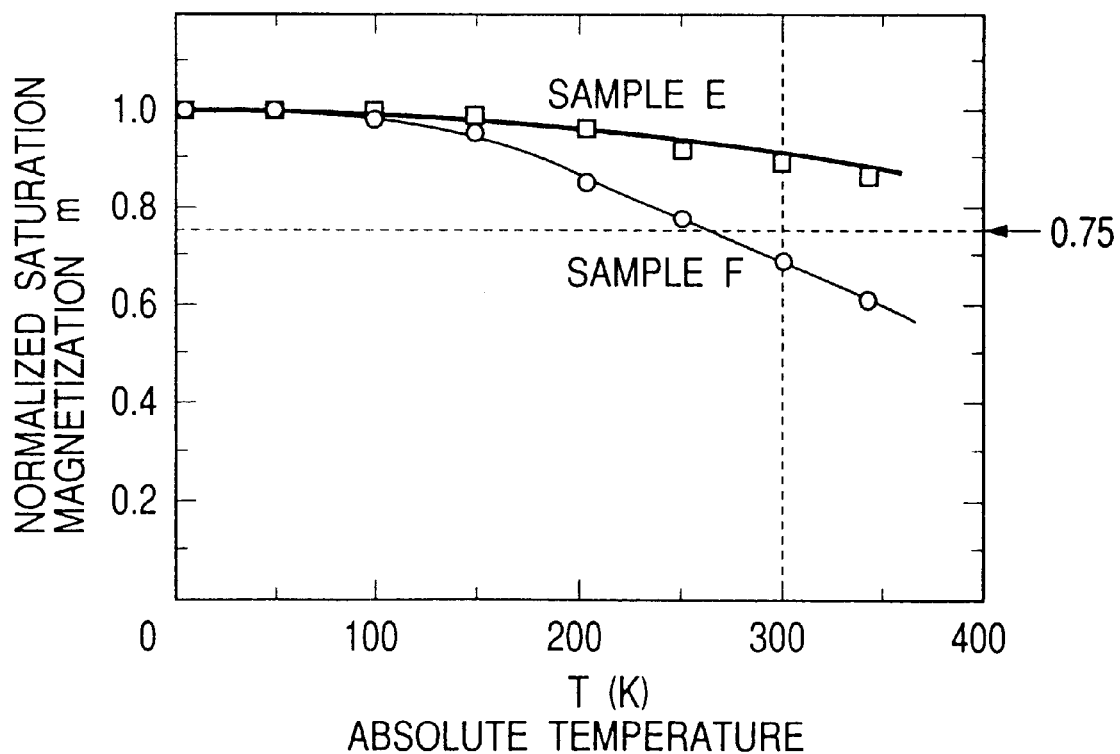
FIG. 6 is a graph showing the dependency on temperature $T^2$ of the normalized saturation magnetization.

For samples E and F, magnetization curves were plotted at various temperatures ranging from 5° K to 350° K. FIG. 6 shows the temperature-dependent variation of saturation magnetization m normalized by the magnitude of saturation magnetization of each sample at T=5° K. Both samples exhibit the simple decrease of the normalized saturation magnetization with the rise of temperature. Sample F has a greater variation of m=0.68 at T=300° K as compared with m=0.90 at T=300° K of sample E.

When the observation results are treated in terms of the relation of m(T) and $T^2$, both samples can be formulated approximately by $m(T) = -A \cdot T^2 + B$. The constant A is $1.1 \times 10^{-6}$ and the intersection of the slope with the $T^2$ axis is at T1=930° K in the case of sample E, whereas A is $3.7 \times 10^{-6}$ and T1 is 520° K in the case of sample F. The normalized saturation magnetization m(T) has the largest temperature-dependent variations per 1° K of 0.0008 and 0.0026 for samples E and F, respectively, within the temperature range 5° K≦T≦350° K.

The magnetic recording media having the foregoing magnetic characteristics were mounted in the magnetic recording apparatus shown in FIGS. 7A and 7B thereby to compare their recording/reproduction characteristics. A thin-film head with a track width of 2.5 μm and a gap length of 0.3 μm was used for recording, and a head of the magneto-resistive effect type with a track width of 2 μm was used for reproduction. At both recording and reproduction, the head was afloat over the medium protection film surface with a clearance of 0.07 μm, with the slider having a relative speed of 11 m/s with respect to the substrate.

Initially, recording at a linear recording density of 20 kFCI was conducted at the room temperature (T=296° K), and next reproduction was conducted at the same temperature. Subsequently, the apparatus was heated to a steady-state temperature of T=350° K in a thermal chamber, and the signal which had been recorded at 20 kFCI at the room temperature was reproduced and compared with the output signal reproduced at the room temperature.

The reproduction output at T=350° K normalized by that at the room temperature (T=296° K) was 0.86 in the case of sample E, whereas the counterpart of sample F was as half as 0.54. In addition to the fall of reproduction output due to the temperature rise, the magnitude of noise increased, particularly in the case of sample F. From the viewpoint of S/N characteristics, the degradation of S/N is more pronounced than the output reduction in the case of sample F.

The magnetic recording apparatus in operation has its internal temperature varying depending on the operational environment of the apparatus. It is necessary for the apparatus to meet the operational condition even if its temperature rises. Specifically, the variation of reproduction output signal must be within 30% for the room temperature when the apparatus is at 350° K. This condition is met by sample E of the inventive medium which has an output reduction of about 15%, whereas sample F has its reproduction output falling to a half and does not ensure the normal operation of the apparatus.

The present invention accomplishes the structure of magnetic recording medium having a smaller temperature-dependent variation of saturation magnetization and a smaller temperature-dependent variation of recording/reproduction characteristics, thereby providing a magnetic recording medium which is advantageous to the achievement of high-density recording.

What is claimed is:

1. A magnetic recording medium having a magnetic recording film formed on a substrate, wherein said magnetic recording film has an average magnitude of saturation magnetization $Ms(T=5° K)$ at 5° K and average magnitude of saturation magnetization $Ms(T=300° K)$ at 300° K which satisfy: $Ms(T=300° K)/Ms(T=5° K) \geq 0.75$, and said magnetic recording film is a polycrystalline film formed of magnetic crystal grains; and wherein, with the size of a magnetic crystal grain of said magnetic recording film being defined in terms of the diameter of a circle having the same area as the magnetic crystal grain along the film surface, the average size d of magnetic crystal grains is greater than 5 nm and smaller than 15 nm.

2. A magnetic recording medium according to claim 1, wherein with respect to the minimum bit length L of recorded bits, the average size d of magnetic crystal grains satisfies: $12 > L/d > 4$.

3. A magnetic recording medium according to claim 2, wherein the average magnetic moment of recorded bits is parallel to the film surface, and the thickness t ($\mu$m) of said magnetic recording film and the average residual magnetization Br (Gauss) of said magnetic recording film at 300° K satisfy: 30 Gauss·$\mu$m < Br·t < 80 Gauss·$\mu$m.

4. A magnetic recording medium according to claim 1, wherein, with the saturation magnetization $Ms(T)$ being normalized by $Ms(T=5° K)$ to be $m(T)=Ms(T)/Ms(T=5° K)$ within the temperature range $5° K \leq T \leq 350° K$ and formulated approximately by a polynomial of absolute temperature T, the normalized saturation magnetization $m(T)$ decreases linearly in proportion to $T^2$, and this linear relation, when expressed in terms of the gradient A of the slope and the intersection B of the slope with the $m(T)$ axis as $m(T)=-A \cdot T^2+B$, satisfies: $0 < A \leq 2.8 \times 10^{-6}(K^{-2})$, where B=1.

5. A magnetic recording medium according to claim 3, wherein, with the saturation magnetization $Ms(T)$ being normalized by $Ms(T=5° K)$ to be $m(T)=Ms(T)/Ms(T=5° K)$ within the temperature range $5° K \leq T \leq 350° K$ and formulated approximately by a polynomial of absolute temperature T, the normalized saturation magnetization $m(T)$ decreases linearly in proportion to $T^2$, and this linear relation, when expressed in terms of the gradient A of the slope and the intersection B of the slope with the $m(T)$ axis as $m(T)=-A \cdot T^2+B$, satisfies: $0 < A \leq 2.8 \times 10^{-6}(K^{-2})$, where B=1.

6. A magnetic recording medium according to claim 4, wherein the relation $m(T1)=0$ is met at a temperature T1 of $T1 \geq 600° K$.

7. A magnetic recording medium according to claim 6, wherein the normalized saturation magnetization $m(T)$ has a temperature-dependent variation per 1° K of 0.002 at maximum within the temperature range $5° K \leq T \leq 350° K$.

8. A magnetic recording medium according to claim 5, wherein the relation $m(T1)=0$ is met at a temperature T1 of $T1 \geq 600° K$.

9. A magnetic recording medium according to claim 8, wherein the normalized saturation magnetization $m(T)$ has a temperature-dependent variation per 1° K of 0.002 at maximum within the temperature range $5° K \leq T \leq 350° K$.

10. A magnetic recording apparatus which includes a magnetic recording medium, a recording medium driver, a magnetic head, a head driver, and a recording/reproducing signal processing system, wherein said magnetic recording medium comprises a magnetic recording medium having a magnetic recording film formed on a substrate, wherein said magnetic recording film has an average magnitude of saturation magnetization $Ms(T=5° K)$ at 5° K and average magnitude of saturation magnetization $Ms(T=300° K)$ at 300° K which satisfy: $Ms(T=300° K)/Ms(T=5° K) \geq 0.75$, and said magnetic recording film is a polycrystalline film formed of magnetic crystal grains; and wherein with the size of a magnetic crystal grain of said magnetic recording film being defined in terms of the diameter of a circle having the same area as the magnetic crystal grain along the film surface, the average size d of magnetic crystal grains is greater than 5 nm and smaller than 15 nm.

11. A magnetic recording apparatus according to claim 10, wherein with respect to the minimum bit length L of recorded bits, the average size d of magnetic crystal grains satisfies: $12 > L/d > 4$.

12. A magnetic recording apparatus according to claim 11, wherein the average magnetic moment of recorded bits is parallel to the film surface, and the thickness t ($\mu$m) of said magnetic recording film and the average residual magnetization Br (Gauss) of said magnetic recording film at 300° K satisfy: 30 Gauss·$\mu$m < Br·t < 80 Gauss·$\mu$m.

13. A magnetic recording medium according to claim 10, wherein with the saturation magnetization $Ms(T)$ being normalized by $Ms(T=5° K)$ to be $m(T)=Ms(T)/Ms(T=5° K)$ within the temperature range $5° K \leq T \leq 350° K$ and formulated approximately by a polynomial of absolute temperature T, the normalized saturation magnetization $m(T)$ decreases linearly in proportion to $T^2$, and this linear relation, when expressed in terms of the gradient A of the slope and the intersection B of the slope with the $m(T)$ axis as $m(T)=-A \cdot T^2+B$, satisfies: $0 < A \leq 2.8 \times 10^{-6}(K^{-2})$, where B=1.

14. A magnetic recording apparatus according to claim 13, wherein the relation $m(T1)=0$ is met at a temperature T1 of $T1 \geq 600° K$.

15. A magnetic recording apparatus according to claim 13, wherein the normalized saturation magnetization $m(T)$ has a temperature-dependent variation per 1° K of 0.002 at maximum within the temperature range $5° K \leq T \leq 350° K$.

16. A magnetic recording medium according to claim 1, wherein said magnetic recording film is including Co and Cr.

* * * * *